United States Patent [19]
Kraft et al.

[11] Patent Number: 6,006,799
[45] Date of Patent: Dec. 28, 1999

[54] MOTOR VEHICLE TANK

[75] Inventors: Burkhard Kraft, Isenbüttel; Liane Ludwig, Wolfsburg; Rolf Reinke, Grussendorf, all of Germany

[73] Assignee: Volkswagen AG, Wolfsburg, Germany

[21] Appl. No.: 09/027,366

[22] Filed: Feb. 20, 1998

[30] Foreign Application Priority Data

Feb. 20, 1997 [DE] Germany ............................ 197 06 717

[51] Int. Cl.[6] .................................................. B60K 15/035
[52] U.S. Cl. .............................. 141/59; 141/44; 141/302; 141/305; 141/307; 141/350; 141/382
[58] Field of Search ................................ 141/44, 59, 290, 141/302, 305, 307, 312, 348–350, 382; 220/86.2

[56] References Cited

U.S. PATENT DOCUMENTS

| | | | |
|---|---|---|---|
| 1,420,624 | 6/1922 | Custer ...................................... | 220/86.2 |
| 4,821,908 | 4/1989 | Yost ........................................... | 141/59 |
| 4,934,417 | 6/1990 | Bucci ....................................... | 141/302 |
| 5,404,906 | 4/1995 | Aoshima et al. .......................... | 141/59 |
| 5,640,993 | 6/1997 | Kasugai etaol. ........................... | 141/59 |
| 5,740,742 | 4/1998 | Maier et al. ............................... | 141/307 |

FOREIGN PATENT DOCUMENTS

| | | |
|---|---|---|
| 3605708 | 10/1986 | Germany . |
| 4102961 | 8/1991 | Germany . |
| 4204747 | 8/1993 | Germany . |
| 19605922 | 8/1996 | Germany . |

*Primary Examiner*—J. Casimer Jacyna
*Attorney, Agent, or Firm*—Baker & Botts, L.L.P.

[57] ABSTRACT

To diminish the escape of fuel vapors from a fuel tank filling tube during filling of the tank, a valve is provided that is switched by insertion of a fuel pump nozzle into the filling pipe so that fuel vapors escaping upon filling of the fuel tank are transmitted with comparatively low flow resistance to an active carbon receptacle. When the fuel pump nozzle is removed from the filling tube, the valve is returned to its normal operating position in which venting of the tank takes place through an upper portion of the tank filling tube and through a gravity valve and a pressure holding valve.

13 Claims, 1 Drawing Sheet

MOTOR VEHICLE TANK

BACKGROUND OF THE INVENTION

This invention relates to motor vehicle tanks having a tank filling tube and a venting system connected to an upper portion of the tank filling tube.

Modern motor vehicle tanks for liquid fuels, in particular vaporizable fuels, have tight tank closures to prevent emission of vapors from the fuel tank and provide special venting system. Such tank venting systems are operative when the tank filling tube is closed. Ordinarily, the venting systems pass vent tank vapors to an active carbon filter which adsorbs fuel vaporized from the tank especially when the vehicle is stationary (e.g., due to heating of the contents of the tank, for example, by solar irradiation) so that no fuel vapors from the tank can escape into the environment. During filling of the tank, the venting system is usually shut off, i.e., is substantially closed, to provide a degree of venting of the tank which corresponds to a refill venting arrangement. Also, filling of the tank is stopped before the tank is completely filled so that, upon expansion of the fuel in the tank due to higher ambient temperature, the vehicle tank will not overflow.

During filling such a motor vehicle tank, the problem arises that fuel vapors present in the tank may escape into the environment. To avoid this, the fuel vapors from the tank may, for example, be captured with a fuel pump filling nozzle having vapor aspiration. But, such filling nozzles are not available everywhere.

SUMMARY OF THE INVENTION

Accordingly, it is an object of the present invention to provide a motor vehicle tank which overcomes disadvantages of the prior art.

Another object of the invention is to provide a motor vehicle tank from which the emission of fuel vapors upon filling is markedly diminished.

These and other objects of the invention are attained by providing a motor vehicle tank with a venting system by which fuel vapors from the tank are normally transferred through a flow path to an upper part of the tank filling tube and in which the flow path is altered during filling of the tank.

In a particular embodiment of the invention, a fuel tank, which may be a blown plastic part, has a tank filling tube through which the vehicle tank is filled. The filling tube is advantageously connected to the body of the tank as a separately manufactured part. The gases displaced from the interior of the tank during filling are captured in a gas trap, i.e., the displaced gases are retained or reacted directly, for example, in the case of environmentally undesirable products, such as fuel vapors. The stored gases may, for example, be drawn off from the gas trap and burned during operation of an internal combustion engine.

Sorbent agents, and particularly, adsorbent agents, such as active carbon, for example, are especially suitable gas traps.

According to the invention, a flow path provided between the interior of the motor vehicle tank, from which fuel vapors are displaced especially during filling but also upon heating of the tank, and the gas trap is variable with respect to traversability by gases escaping from the interior of the tank, and is switched to an increased gas traversability during a filling operation. Outside of the filling operation, i.e., for example when no fuel pump filling nozzle is inserted into the filling tube of the tank and/or when the tank filling tube is closed, the flow passage between the interior of the tank and the gas trap has a higher flow resistance to the gases. That is, except for filling, the flow path may either be closed or it may be open but with a higher flow resistance than during filling. Such higher flow resistance may be achieved by the interposition of various devices which are advantageous especially during operation of an internal combustion engine which is supplied with fuel from the motor vehicle tanks. In other words, increased gas flow through the flow path between the interior of the tank and the gas trap during filling is advantageously achieved by bypassing such devices.

The gas flow reducing devices may include a safety device such as, for example, a gravity valve and/or a pressure-holding valve, The gravity valve shuts off the flow path in the event of an extreme oblique position of the tank, for example when the motor vehicle is lying on its side or roof in the event of an accident. In such a situation, the gravity valve prevents fuel from passing from the fuel tank into the active carbon receptacle. Another device is a so-called pressure-holding valve, which diverts any excess pressure and/or negative pressure in the interior of the fuel tank to the gas trap, which may be an active carbon receptacle, and/or to the fuel line leading from fuel tank to the internal combustion engine supplied by the fuel tank. This pressure holding valve advantageously closes in event of a negative pressure from the engine intake relative to the interior of the fuel tank in order to protect the fuel tank from an interior negative pressure which is too high.

The variation of flow resistance in the flow path between the fuel tank and the gas trap is preferably achieved by a valve. In one embodiment, in which the valve is preferably operated by the fuel nozzle or by the tank closure, the flow variation is achieved by the insertion of a fuel pump nozzle into the tank filling tube and/or by the opening of the tank filling tube.

To especial advantage, the tank filling tube may be provided with a barrier which reduces any escape of evaporating fuel gases from the tank filling tube into the environment. Such a barrier may, for example, comprise a seal around the pipe of the fuel pump nozzle when the nozzle is inserted into the filling tube and a flap which closes the filling tube upon extraction of the fuel pump nozzle. Alternatively, however, the barrier may be effected by flow dynamics, the tank filling tube being formed, for example, in the manner of a liquid jet vacuum pump to provide a liquid seal. This is effected for example by tapering the flow cross-section of the tank filling tube to reduce it in the direction toward the tank so that the fuel passing through the tank filling tube will flow faster along the taper, thus entraining gases from the filling tube.

In a further refinement of the invention, which may be used with any embodiment, a flow path between the interior of the fuel tank and an upper region of the tank filling tube may be restricted, preferably closed completely when filling the vehicle tank. This prevents any escape of the gases displaced from the interior of the tank through the filling tube into the atmosphere and minimizes the cost involved in scaling a fuel pump nozzle.

BRIEF DESCRIPTION OF THE DRAWINGS

Further objects and advantages of the invention will be apparent from a reading of the following description in conjunction wit the accompanying drawings in which.

DESCRIPTION OF PREFERRED EMBODIMENTS

Figure 1:
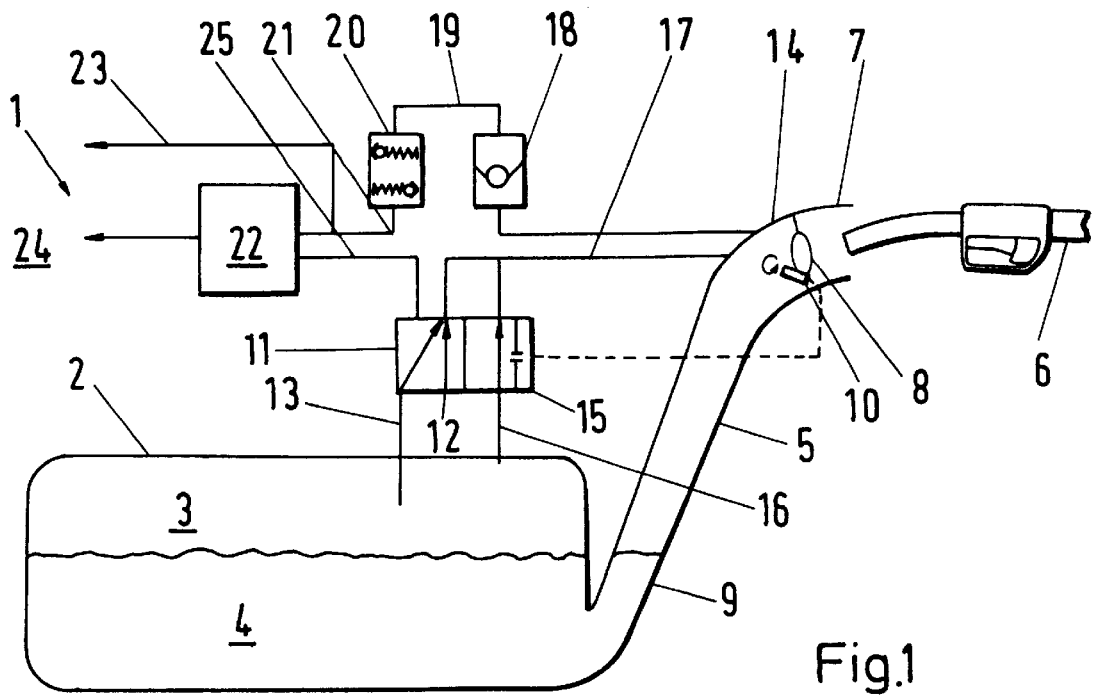
FIG. 1 is a schematic diagram illustrating a representative embodiment of a fuel tank according to the invention; and, FIG. 2 is a schematic diagram illustrating another representative embodiment of a fuel tank according to the invention.

In a typical embodiment of a fuel tank 1 shown in FIG. 1, a tank body 2 has an interior region 3 in which a fuel 4 is stored. The fuel 4 is drawn from the tank by a conventional arrangement, not shown, such as, for example, a fuel pump installed in the tank body 2 or else a simple fuel line inserted in the tank.

To fill the tank with fuel 4, the tank body 2 is provided with a filling tube 5. The filling tube has an opening 7 which is configured to accept a fuel pump nozzle 6 and has flap 8 which is normally closed and is opened by insertion of the pump nozzle 6. The filling tube 5 is tapered to provide a reduced flow cross-section in its lower portion adjacent to the tank, so that fuel flowing from the pump nozzle 6 into the filling tube 5 flows faster in the lower portion 9. This generates a negative pressure within the filling tube that draws ambient air into the opening 7 so that practically no fuel vapors will emerge from the opening 7 during filling.

When the flap 8 is opened by introduction of the pump nozzle 6, a rotary valve actuator 10 is turned, operating a valve 11. The valve 11 is shown in its normal operation position, i.e. with the flap 8 closed. In this position, the valve 11 connects a fill vent line 13, which projects from the top of the tank into the interior 3 of the tank, with the upper portion 14 of the tank filling tube through a valve section 12. At the same time, another valve section 15 of the valve 11 connects an operating vent line 16 to the upper region 14 of the filling tube 5. Preferably the valve 11 is mounted directly on the upper portion 14 of the filling tube 5 is that the connecting line 17 shown in FIG. 1 is not necessary The upper portion 14 of the fill tube 5 is also connected to a gravity valve 18 which, like the valve 11, may be mounted directly on the filling tube. The gravity valve 18 is arranged to close a line 19 in an extreme oblique position of the fuel tank 1. From the gravity valve 18, the line 19 leads to a pressure-holding valve 20 having an outlet 21 connected to an active carbon receptacle 22 and to a line 23 leading by way of a timing valve (not shown) to an internal combustion engine (not shown). The outlet from the active carbon receptacle is connected to a leak diagnosis pump (not shown) which monitors tightness of the fuel tank 1.

With the valve 11 set in the operating position as illustrated, any excess pressure of the gases in the tank interior 3 above the fuel 4 can be released through the valve 11 to the upper region 14 of the filling tube and through the gravity valve 18 and the holding valve, 20 into the active carbon receptacle 22 or to the internal combustion engine if the engine is running.

The pressure-holding valve 20 opens in case of either negative pressure or excess pressure in the line 19 and closes when the pressure in line 21 is below the ambient pressure. In this way, even when the engine is not operating, gases can escape from the interior 3 of the tank body 2 by way of the lines 16, 17, 19 and 21 into the active carbon receptacle 22, whereas, during operation of the engine, a negative pressure in the line 23 is not transmitted to the interior 3 but effects a reverse flow through the active carbon receptacle 22, which is thereby cleared of adsorbed fuel.

Upon introduction of the pump nozzle 6 into the filling tube opening 7, the flap 8 is opened shifting the valve 11 by way of a rotary slide 10 to the position not illustrated, so that the line 16 is closed and the line 13 is switched directly to a line 25. Thus the gases escaping from the interior 3 can pass directly by way of the section 12 of the valve 11 into the active carbon receptacle 22, without passing through the gravity valve 18 and the pressure holding valve 20, so that the gases from the tank interior 3 encounter a much smaller flow resistance. In addition, the gases displaced from the interior 3 are no longer passed into the upper region 14 of the tank filling tube 5 so that the gases displaced from the interior 3 cannot escape into the atmosphere As soon as the fuel level in the tank body 2 rises to the level of the lower opening of the fill vent 13 during filling of the tank, the fuel will rise quickly in the fill tube 5, causing the pump nozzle 6 to be shut off.

Figure 2:
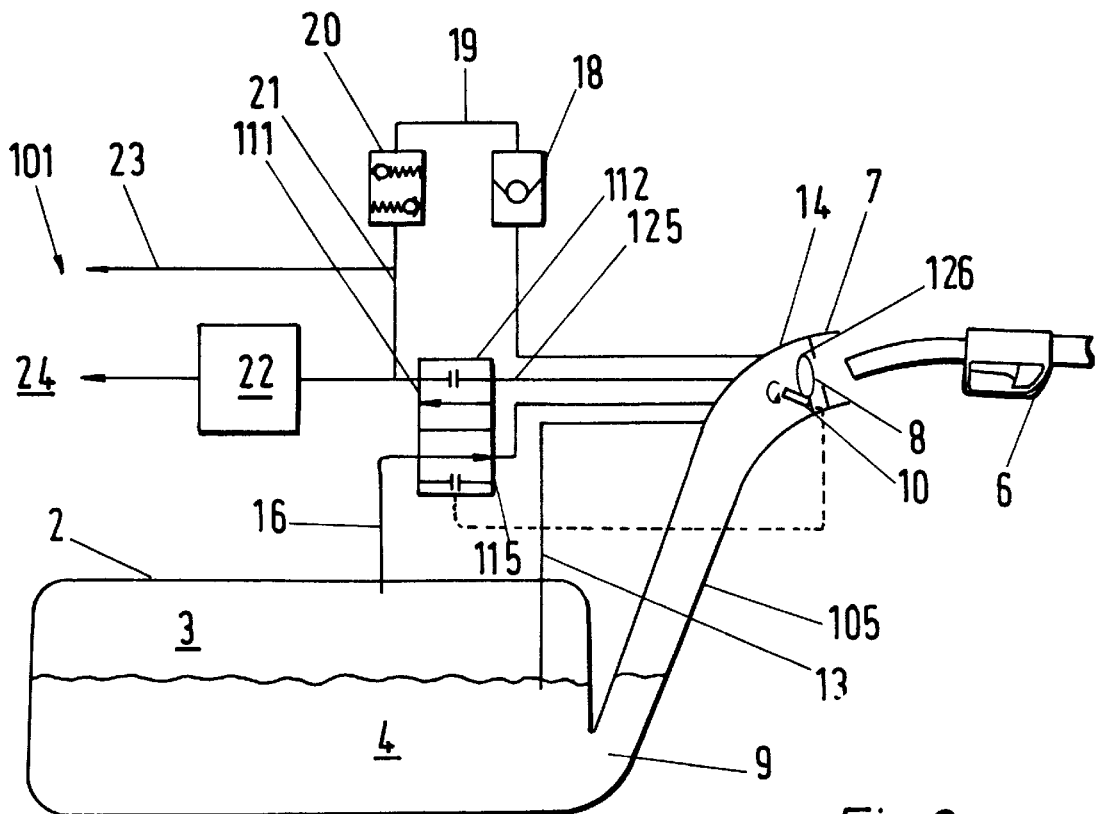

In the embodiment of the invention shown in FIG. 2, a fuel tank 101 is generally similar to the fuel tank 1 of FIG. 1, and the corresponding parts are similarly identified. Unlike the fuel tank 1, however, the fuel tank 101 produces little or no suction effect by tapering of the tank filling pipe 105 so that, to avoid escape of fuel vapors through the opening 7 or from the upper region of the tank filling tube 105, a seal 126 surrounds and engages the pipe of the fuel pump nozzle 6 so as to seal the opening 7. Since the line 16 is closed when the tank is being filled, much as in FIG. 1, the gases displaced from the interior 3 of the tank can escape only through the vent system 13. As a result, as soon as the liquid level of the fuel 4 has reached the lower end of the line 13, a gas cushion forms above the fuel 4 and the fuel rises in the line 13 and the fuel in the tank filling tube 5 rises as well, causing the fuel pump nozzle 6 to be shut off. Upon withdrawal of the pump nozzle 6, the flap 8 closes, returning the valve 11 from its filling position to its normal operating setting, so that the interior 3 is again vented through the line 16. As a result, the fuel which has risen in the line 13 and in tank fill nozzle 5 can drop to a uniform level within the interior 3 of the tank.

In the operating position shown in FIG. 2, the interior 3 of the tank is vented by the line 16 through one section 115 of a valve 111 to the upper portion of the filling tube 105. From there the gases flow through the gravity valve 18 and the holding valve 20, to either the active carbon receptacle 22 or, by way of line 23, the internal combustion engine, as described above in connection with FIG. 1. Thus far the flow pattern of the displaced gases is the same as described above. During filling of the tank, however, the flow pattern is different. When the fuel pump nozzle 6 is inserted through the seal 126, the flap 8 is pivoted so that the valve 111 is shifted by way of the rotary valve actuator 10. This closes the operating vent 16, but, contrary to the FIG. 1 embodiment, it does not provide direct access from the fill venting system 13 to the active carbon receptacle 22. In the embodiment according to FIG. 2, an unvalved fill venting line 13 is connected from the tank directly to the upper portion 14 of the tank fill pipe 105. The gases displaced from the interior 3 of the tank during filling flow into the upper portion 14 of the tank fill nozzle 105 and then pass through a line 125 to another section 112 of the valve 111 which, in the shifted position not illustrated in FIG. 2, passes the gases directly to the active carbon receptacle 22. Accordingly, contrary to the FIG. 1 embodiment as described above, the gases displaced from the interior 3 during filling are in this case not blocked from the upper region 14 of the tank filling pipe but the seal 126 nevertheless avoids release of the displaced gases into the environment.

Although the invention has been described herein with reference to specific embodiments, many modifications and variations therein will readily occur to those skilled in the art. Accordingly, all such variations and modifications are included with the intended scope of the invention.

We claim:

1. A motor vehicle tank comprising:

a tank having a filling tube through which the tank can be filled a first venting system connecting the interior of the tank to an upper portion of the tank filling tube whereby gases from the interior of the tank can be supplied by way of a first flow path into the upper portion of the tank filling tube;

a first flow path altering means for increasing the flow resistance to gases in the first flow path from the interior of the tank to the upper portion of the filling tube during filling of the tank through the filling tube;

a second venting system connecting the interior of the tank by way of a second flow path to a gas trap which diminishes escape of an environmentally undesirable portion of the gases into the environment and to which gases may be supplied from the interior of the tank; and a second flow path altering means which diminishes the flow resistance to gases in the second flow path between the interior of the tank and the gas trap during filling of the tank through the filling tube;

wherein the second flow path between the interior of the tank and the gas trap includes:

an operation line leading to the gas trap through a gravity valve and a pressure holding valve connected to an engine feed line which feeds gaseous fuel to the engine; and a further line leading to the gas trap which has a reduced gas flow traversability and which is switched open during a filling operation and switched closed when there is no filling operation.

2. A motor vehicle tank-according to claim 1, further comprising an additional flow path between the interior of the tank and an upper region of the tank filling tube, and wherein the flow path altering means increases the flow resistance to gases in the additional flow path between the interior of the tank and the upper portion of the tank filling tube.

3. A motor vehicle tank according to claim 1 or claim 2 wherein the flow path altering means is a valve.

4. A motor vehicle tank according to claim 1 or claim 2 wherein the flow path altering means is actuated by introduction of a tank filling means into the filling tube.

5. A motor vehicle tank according to claim 1 or claim 2 wherein the flow path altering means is actuated by closing of the tank filling tube.

6. A motor vehicle tank according to claim 1 or claim 2 including gas retaining means for diminishing any escape of gases from the tank filling tube upon filling.

7. A motor vehicle tank according to claim 6 wherein the gas retaining means includes a seal between the tank filling tube and a filling means.

8. A motor vehicle tank according to claim 6 wherein the tank filling tube forms a suction device to aspirate ambient air into the interior of the tank during filling.

9. A motor vehicle tank according to claim 1 or claim 2 wherein the gas trap includes a sorbent material.

10. A motor vehicle tank according to claim 1 or claim 2 wherein the venting system permits gas to flow from the interior of the tank to the gas trap also when the tank is not being filled.

11. A motor vehicle tank according to claim 1 or claim 2 wherein the tank is a fuel tank for liquid fuel.

12. A motor vehicle tank according to claim 1 or claim 2 wherein the gas trap traps fuel vapors.

13. A motor vehicle tank according to claim 1 wherein the further line is switched to provide a direct connection from the interior of the tank to the gas trap during a filling operation.

* * * * *